(12) United States Patent
Tseytlin

(10) Patent No.: US 10,672,087 B1
(45) Date of Patent: Jun. 2, 2020

(54) ORDER VOLUME MANAGEMENT SYSTEM

(71) Applicant: AMAZON TECHNOLOGIES, INC., Seattle, WA (US)

(72) Inventor: Yan Tseytlin, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 508 days.

(21) Appl. No.: 15/456,102

(22) Filed: Mar. 10, 2017

(51) Int. Cl.
G06Q 50/12 (2012.01)
G06Q 10/06 (2012.01)
G06Q 30/02 (2012.01)
G06Q 30/06 (2012.01)

(52) U.S. Cl.
CPC ....... *G06Q 50/12* (2013.01); *G06Q 10/06393* (2013.01); *G06Q 10/06395* (2013.01); *G06Q 30/0282* (2013.01); *G06Q 30/0635* (2013.01)

(58) Field of Classification Search
CPC .............................. G06Q 10/00; G06Q 40/00
USPC ................................................ 705/7.29–7.39
See application file for complete search history.

(56) References Cited

U.S. PATENT DOCUMENTS

| | | | | |
|---|---|---|---|---|
| 7,589,628 B1 * | 9/2009 | Brady, Jr. | ............. | H04W 4/029 340/539.11 |
| 8,055,548 B2 * | 11/2011 | Staib | ............. | G06Q 10/107 705/26.1 |
| 8,407,110 B1 * | 3/2013 | Joseph | ............. | G06Q 10/087 705/26.1 |
| 9,639,873 B2 * | 5/2017 | Zamer | ............. | G06Q 30/0605 |
| 2001/0025279 A1 * | 9/2001 | Krulak | ............. | G06Q 30/06 |
| 2006/0271394 A1 * | 11/2006 | Kelly | ............. | G06Q 10/00 705/7.36 |
| 2007/0299743 A1 * | 12/2007 | Staib | ............. | G06Q 10/107 705/7.33 |
| 2013/0054367 A1 * | 2/2013 | Grigg | ............. | G06Q 30/0207 705/14.58 |
| 2014/0156399 A1 * | 6/2014 | Jones | ............. | G06Q 30/0255 705/14.53 |
| 2014/0229390 A1 * | 8/2014 | Morris | ............. | G06Q 10/103 705/302 |
| 2015/0248651 A1 * | 9/2015 | Akutagawa | ............. | G06Q 10/1095 705/7.19 |
| 2016/0110361 A1 * | 4/2016 | Jamrog | ............. | G06F 16/24578 707/723 |
| 2016/0125446 A1 * | 5/2016 | Gonen | ............. | G06Q 30/0226 705/14.27 |
| 2017/0091713 A1 * | 3/2017 | Paris | ............. | G06Q 10/1093 |
| 2017/0091881 A1 * | 3/2017 | Canale | ............. | G06Q 50/12 |

* cited by examiner

Primary Examiner — Romain Jeanty
(74) Attorney, Agent, or Firm — Lowenstein Sandler LLP

(57) ABSTRACT

A merchant management system including an order management application to manage customer orders for bespoke or made-to-order goods and determine a suitable allocation of order volume to respective available merchants. The order management application collects, determines, and considers "online" activity data and "offline" activity data in generating a suitability score for each available merchant as it relates to allocation of an existing order volume or a projected order volume.

17 Claims, 6 Drawing Sheets

FIG. 5

| Merchant Name | Requested Order Volume | Merchant Offer Information | Suitability Score | Ranking | Order Volume Allocation |
|---|---|---|---|---|---|
| Merchant 1 | 215 pizzas over the next 30 days | 19% rev share | 91% | 1 | 208 pizzas over the next 30 days |
| Merchant 2 | 302 pizzas over the next 30 days | 14% rev share | 86% | 3 | 264 pizzas over the next 30 days |
| Merchant 3 | 192 pizzas over the next 30 days | 18% rev share | 89% | 2 | 182 pizzas over the next 30 days |

ORDER VOLUME MANAGEMENT SYSTEM

BACKGROUND

In a marketplace environment, a bespoke or made-to-order item (e.g., food, tailored clothing, signage, etc.) may be ordered by a customer with the expectation of high quality craftsmanship and fast and efficient delivery. For example, in the food services industry, restaurants are challenged with fulfilling food orders of various different sizes and tasked with preparing and delivering the order in a time-sensitive manner.

Frequently, a customer may place an order via an intermediary ordering platform, wherein the merchant assigned to fulfill the order is select by the customer or at random. In such instances, a new order may be presented to a merchant for immediate fulfillment such that a decision as to whether to accept the order must be made by the merchant quickly and with little to no contextual information. In addition, the current order acceptance decision model for the merchant forces each merchant to accept or reject an order or volume of projected orders based on limited information and without control over expanding their current order volume allocation.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 5 illustrates an example chart including information generated by a merchant management system, according to various embodiments of the present disclosure.

DETAILED DESCRIPTION

Figure 1:
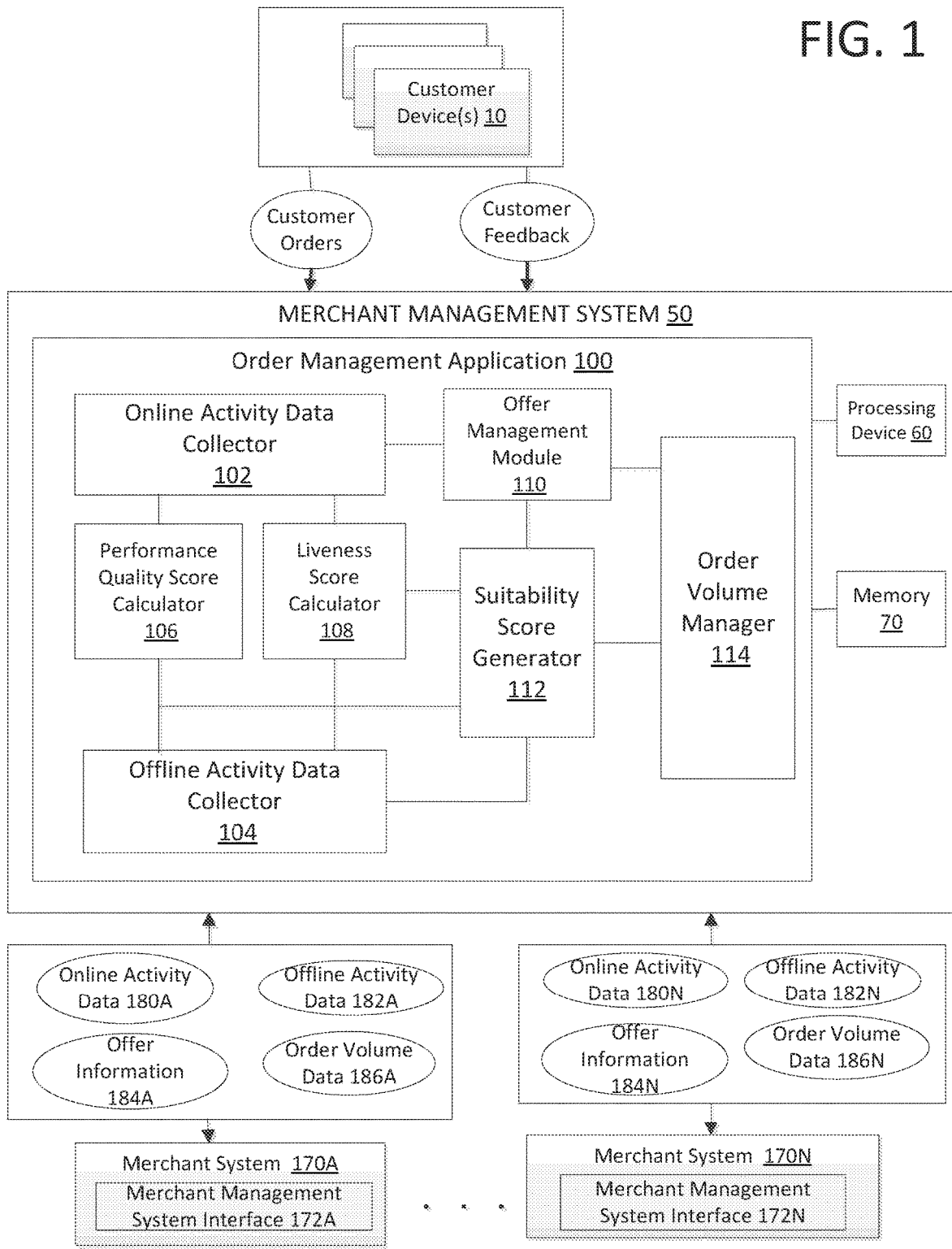
FIG. 1 illustrates a system for allocating order volumes to multiple merchant systems, according to various embodiments of the present disclosure.

The present disclosure relates to managing customer orders for bespoke items (e.g., food) and determining a suitable allocation of order volume to respective available merchants. Described herein is a merchant management system to collect, determine, and consider "online" activity data and "offline" activity data in generating a suitability score for each available merchant as it relates to an existing order or order volume or a projected order or order volume.

According to embodiments, the order processing environment includes various "online" interactions between a merchant management system, customer devices, and merchant systems. These online interactions generate collectable online activity data that represents various aspects of the order management and fulfillment process, such as, for example, a merchant's availability status (i.e., whether the merchant is buyable, discoverable and available for order fulfillment and delivery), customer feedback information, customer refund requests, delivery distance, order size, order content, order preparation time, order delivery time etc. In one embodiment, online activity data (or online inputs) represent information that is measured, monitored, tracked, collected, etc. by the merchant management system as part of the order fulfillment process.

In addition, various "offline" activity data may be considered with the online activity data in determining the suitability score for a merchant and matching an order volume with the merchant. Example offline activity data may include a time it takes the merchant to source the ingredients for each order, a time it takes the merchant to compile or prepare the final bespoke product, a time it takes the merchant to prepare an order for delivery, an inventory of the merchant (e.g., a number or amount of ingredients (e.g., eggs, flour, vegetables, fruits, dairy products, etc.)), menu items, the hours of operation of a merchant, a number and type of ingredients, parts, materials, etc. associated with the preparation of a bespoke item (e.g., a food order) that can be ordered from the merchant, etc. In one embodiment, the offline activity data may be collected via communications between merchant management system and a computing device (e.g., a tablet) located at a merchant location, analysis of a merchant menu, detection of a location of a computing device located at a merchant, a strength of a communication signal (e.g., a Wifi signal) of a network-connected computing device of a merchant, etc.)

For example, offline activity data may refer to information associated with the preparation of a desired item that is determined based on "offline" inputs. The offline inputs include information regarding activity that occurs outside of the activity that is tracked by the merchant management system by way of inputs and communications with the customers and merchants in an order fulfillment process.

In one embodiment, the merchant management system determines an opportunity or instance when a merchant is in a position to accept additional order volume and the type of order volume the merchant can accept. In one embodiment, extra capacity of a merchant is identified and a request from the merchant for the additional order volume is received. The system can use this information to drive or direct additional orders to the merchant to satisfy the merchant's request. For example, the merchant management system may have one or more customer orders that have not yet been associated with a particular merchant for fulfillment purposes. In this example, the merchant management system may review one or more volume requests from merchants and determine a suitable merchant for fulfillment of those open or outstanding customer orders.

In one embodiment, the merchant management system may analyze the online and offline activity data to identify opportunities to expand the future order volume allocated to a merchant. Upon determining that a particular merchant has additional capacity and has a high suitability score, the merchant management system may generate and transmit a communication (e.g., an advertisement) to a customer identifying the merchant and optionally, including a promotional offer (e.g., guaranteed delivery in the next 20 minutes for all orders of X value to all customer in the Anytown, USA area).

With the emergence of electronic commerce, merchants (e.g., food and beverage providers) offer an increasing online presence to enable a customer to place orders for bespoke or made-to-order items via an electronic interface. Conventional marketplaces provide for inefficiency in the selection of a merchant to match to a bespoke order (e.g., a food order) or the allocation of future order volume to a merchant based on a suitability score derived from online activity data and offline activity data.

According to the present disclosure, the merchant management system may intake orders from the multiple different customers and manage those orders using an order management application. The order management application also collects and analyzes online activity data and offline activity data associated with multiple different merchants. Collection of the online and offline activity data by the order management application allows merchants to be evaluated and scored for suitability as it relates to pending and future customer order volumes and enables a merchant to increase or decrease an order volume amount allocated by the merchant management system.

In the following discussion, a general description of the system and its components is provided, followed by a discussion of the operation of the same. Although the description includes certain examples relating to the order management application employed in a food services environment, it is to be appreciated that the order management system is not limited to managing food orders. For example, the order management system may be used to manage orders relating to any bespoke or made-to-order goods.

FIG. 1 illustrates an example marketplace environment including a merchant management system 50 having an order management application 100 interfacing with multiple customer devices 10 to receive and process multiple orders and allocate those orders to multiple merchant systems 170A, 170N. The merchant system 50 may include a processing device 60 to execute the order management application 100 and a memory 70 to store data associated with the operations and functions of the order management application 100. The customer device(s) 10 may comprise, for example, a processor-based system such as a computer system. Such a computer system may be embodied in the form of a desktop computer, a laptop computer, one or more server computers, personal digital assistants, cellular telephones, smartphones, set-top boxes, music players, web pads, tablet computer systems, game consoles, electronic book readers, or other devices with like capability.

In one embodiment, the order management application 100 may include various modules or components configured to perform the various functions and operations of the merchant management system 50, as described in greater detail below. In one embodiment, the merchant management system 50 includes an online activity data collector 102, an offline activity data collector 104, a performance quality score calculator 106, a liveness score calculator 108, an offer management module 110, a suitability score generator 112, and an order volume management module 114. The components and modules described herein may represent sets of instructions, programs, applications, elements, or other are provided for example purposes, and it is noted that fewer or additional components than those identified may be employed to execute the functions and operations of the order management application 100.

In one embodiment, the online activity data collector 102 communicates with the merchant systems 170A, 170N and customer devices 10 to collect online activity data 180A, 180N associated with the respective merchants and customers. According to embodiments, the online activity data 180A, 180N relates to interactions between the merchant management system 50, the customer devices 10, and merchant systems 170 relating to the processing of historical and pending customer orders. The online activity data relates to the online interactions that generate online activity data associated with various aspects of the order management and fulfillment process. Example online activity data includes, but is not limited to, a merchant's availability status (i.e., whether the merchant is buyable, discoverable and available for order fulfillment and delivery), order fulfillment time and details, customer feedback information (e.g., ratings), customer refund requests, delivery distance, order size, order content, order preparation time, order delivery time (e.g., historical and predicted delivery times), etc. In one embodiment, online activity data (or online inputs) represent information that is measured, monitored, tracked, collected, etc. by the merchant management system as part of the order fulfillment process. In one embodiment, the online activity data 180A, 180N may be collected via communications between a merchant management system interface 172A, 172N of the respective merchant systems 170A, 170N. For example, the merchant management system interface 172A, 172N may be an application program interface (API) installed on the merchant system 170A, 170N (e.g., a tablet) that is configured to exchange messages and data with the merchant management system 50.

In one embodiment, the offline activity data collector 104 communicates with the merchant systems 170A, 170N to collect offline activity data associated with the respective merchants. The offline activity data relates to information that is tracked or managed "offline" with respect to the online processing of customer orders. In one embodiment, the offline activity data 182A, 182N includes information that impacts order fulfillment, but may not be collected as part of the processing and fulfillment of a customer order (e.g., online activity data). For example, offline activity data 182A, 182N may include traffic information, weather information, a number of ingredients, parts or materials associated with the preparation of a bespoke item (e.g., a food item), hours of operation of a merchant, a menu or catalog of a merchant, a current inventory or amount of items (e.g., in-stock and available inventory) maintained by a merchant, an estimate of a time to prepare a particular order (e.g., on an item-by-item preparation time estimate), location information (e.g., longitude and latitude information) associated with a computing device (e.g., a tablet) of the merchant system 170A, 170N, a strength of a network signal (e.g., a Wifi signal) of a computing device of the merchant system 170A, 170N, etc.

In an example, the offline activity data 182A, 182N may include information used to determine whether a merchant is capable of fulfilling an order and an amount of time it is expected to take to prepare the order. In one embodiment, the offline activity data may be collected via communications between merchant management system 50 and the merchant management system interface 172A, 172N of the respective merchant system 170A, 170N. a computing device (e.g., a tablet) located at a merchant location, analysis of a merchant menu, detection of a location of a computing device located at a merchant, a strength of a communication signal (e.g., a Wifi signal) of a network-connected computing device of a merchant, etc.)

In one embodiment, the merchant management system interface 172A may include a web-based portal (e.g., a website or web-enabled application) accessible by the merchant management system 50 to facilitate the communication of the online activity data 180A, 180N and the offline activity data 182A, 182N.

In one embodiment, the performance quality score calculator 106 receives online activity data processed by the online activity data collector 102 and uses the online activity data to generate a performance quality score for each merchant. The performance quality score may be based on online activity data such as customer feedback ratings, customer refund requests (e.g., refunds requested due to merchant error), delivery distance and time (e.g., historical and predicted distances and times associated with point-to-point delivery of an order from a merchant to a customer), batch or order size, order content, etc. In one embodiment, the performance quality score calculator 106 generates a performance score for each merchant as an indicator of the merchant's performance history and expected future performance. In one embodiment, the performance quality score may be a numerical value or percentage represented on an ascending scale of 0 to 100 or a letter grade or value on an ascending scale of F to A. In one embodiment, the performance quality score may be used as a metric in assessing the merchant's suitability as it relates to allocating future order volumes, as described in greater detail below.

In one embodiment, the liveness score calculator 108 receives online activity data 180A, 180N and calculates a liveness score for each of the multiple merchants. In one embodiment, the liveness score is a measure of the "availability" of a merchant. In one embodiment, offline activity data 184A, 184N may be used in calculating the liveness score. In one embodiment, the liveness score quantifies a time the merchant is buyable (e.g., capable of receiving an order), discoverable (e.g., electronically connectable or communicatively connected to the merchant management system 50), available and ready for the fulfillment (e.g., a number of staff members on duty, input of a confirmation of receipt and completion of an order, etc.), and delivery of an order (e.g., whether the merchant has the capacity to prepare the one or more goods associated with an order and deliver the one or more goods to the customer). In one embodiment, the liveness score represents a measurement of a quality of a connection between the merchant management system and the merchant system based on various heuristics (e.g., offline activity data) associated with the computing device (e.g., a tablet running a client version of the order management application) such as the state of the tablet (e.g., on, off, under maintenance, currently process an order, etc.), a location of the tablet within the merchant facility (e.g., longitude and latitude information), a network connection strength of the tablet, a volume setting on the tablet, etc.

In one embodiment, the liveness score may be a numerical value or percentage calculated for the merchant on a scale of 0 to 100. For example, a first merchant may have a liveness score of 87 out of 100. In one embodiment, the liveness score may represent the merchant's availability and may be used to compare multiple eligible merchants as it relates to selection of a preferred or recommended merchant during an order matching process.

In one embodiment, the offer management module 110 interacts with the merchant systems 170A, 170N to receive offer information 184A, 184N relating to a current or pending order volume (e.g., an order placed by a customer that is awaiting allocation to a merchant for fulfillment) or a future order volume desired by the merchant (e.g., an order volume requested by a merchant for an upcoming period of time). The offer information 184A, 184N may include information submitted by a merchant including details relating to the merchant's offer to obtain an allocation of an order volume. For example, the offer information 184A, 184N may include financial terms and conditions associated with fulfillment of an order (e.g., a price per unit/item, a revenue sharing value (e.g., a percentage of revenue sharing with the merchant management system 50 operator that the merchant is willing to accept), terms and conditions of the food preparation and delivery (e.g., a guaranteed performance quality score associated with an order), promotional information (e.g., rebates, coupons, discounts, etc.) For example, if a merchant is seeking a large allocation (e.g., a high order volume), the merchant may submit offer information 184A, 184N including a higher relative revenue sharing percentage as compared to if the merchant is seeking a small order volume. In one embodiment, the offer information 184A, 184N represents an interest level of a merchant as it relates to a particular order volume (e.g., customer A's order for 10 pizzas) or a prospective order volume desired by the merchant (e.g., a first merchant seeks 120 orders for pepperoni pizzas during the next 30 days).

In one embodiment, the offer management module 110 may transmit order volume data 186A, 186N to multiple merchant systems 170A, 170N to solicit the merchant's offers and offer information associated with a particular order from a customer, aggregated orders from multiple customers or a prospective order volume for an upcoming time period. In an example, the order volume data 186A, 186N may include information about the order(s) including the items ordered, the desired delivery time, the desired price, a location of the customer, a target cost revenue sharing percentage, etc.

In one embodiment, the suitability score generator 112 receives one or more of the following data components relating to a merchant: the offer information associated with a merchant from the offer management module 110, the performance quality score from the performance quality score calculator 106, a liveness score from the liveness score calculator 108, or the offline activity data from the offline activity data collector 104. It is noted that the suitability score may be generated based on any combination of the above-identified factors. In one embodiment, the suitability score generator 112 is configured to calculate an overall suitability score for a merchant as it relates to suitability to accept and fulfill a particular order or a particular volume of orders. In one embodiment, the suitability score is calculated based on the performance quality score, the liveness score, and the offline activity data associated with a merchant. In one embodiment, various weights or importance values may be assigned to the different metrics used to generate the composite suitability score.

In one embodiment, the suitability score may include factors relating to the country of operation of the merchant. For example, parameters such as the governing transportation laws (e.g., the allowance of modes of transportation relating to the delivery of goods such as drones, bicycles, etc.), food regulation laws (e.g., health standards, food service codes and regulations, safety regulations, compliance, etc.), etc. may be considered by the merchant management system as it relates to the impact of the timing and quality of the processing and delivery of a customer order volume.

In one embodiment, the order volume manager 114 receives one or more customer orders from one or more customer devices 10 and uses the suitability score to allocate the orders to one or more merchant systems 170A, 170N. For example, offer information associated with a particular customer order may be received from a first set of merchants (e.g., merchant 1, through merchant 10). Offer information may be collected from the ten merchants and processed by the suitability score generator along with corresponding performance quality scores, liveness scores, and offline activity data associated with the first set of merchants. In this example, a suitability score may be generated for each of the first set of merchants as a measure of each merchant's suitability to fulfill all or a portion of the customer order.

In one embodiment, the order volume manager 114 may rank the first set of merchants based on their respective suitability score and identify a smaller set of eligible merchants. For example, the order volume manager 114 may apply one or more different filters to refine the first set of merchants to a subset of eligible merchants. In one embodiment, the filters may be based on any one or more aspects or elements of the performance quality score, the liveness score, the offer information, the offline activity data, the suitability score, the customer order, the customer feedback, etc. Example filters may include a minimum suitability score, a minimum liveness score, a minimum performance quality score, identification of one or more particular elements of offline activity data (e.g., identifying that a merchant has a particular menu item associated with the order or a current capacity of staffers needed to fulfill the order within a desired time frame), a minimum revenue sharing rate, etc.

In one embodiment, the order volume manager 114 matches the customer order with one or more merchants and allocates the customer order to the one or more merchants in view of the suitability scores associated with the merchants. In one example, the order volume manager 114 may partition an order volume for allocation to multiple different merchants. In one embodiment, upon matching the customer order volume to one or more selected merchants (i.e., the one or more merchants identified as the most suitable based on the suitability score), the order volume manager 114 transmits order details to the one or more selected merchants.

It is noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of orders (e.g., food orders) herein is merely by way of example. Suitable alternatives known to those of skill in the art may be employed.

Figure 2:
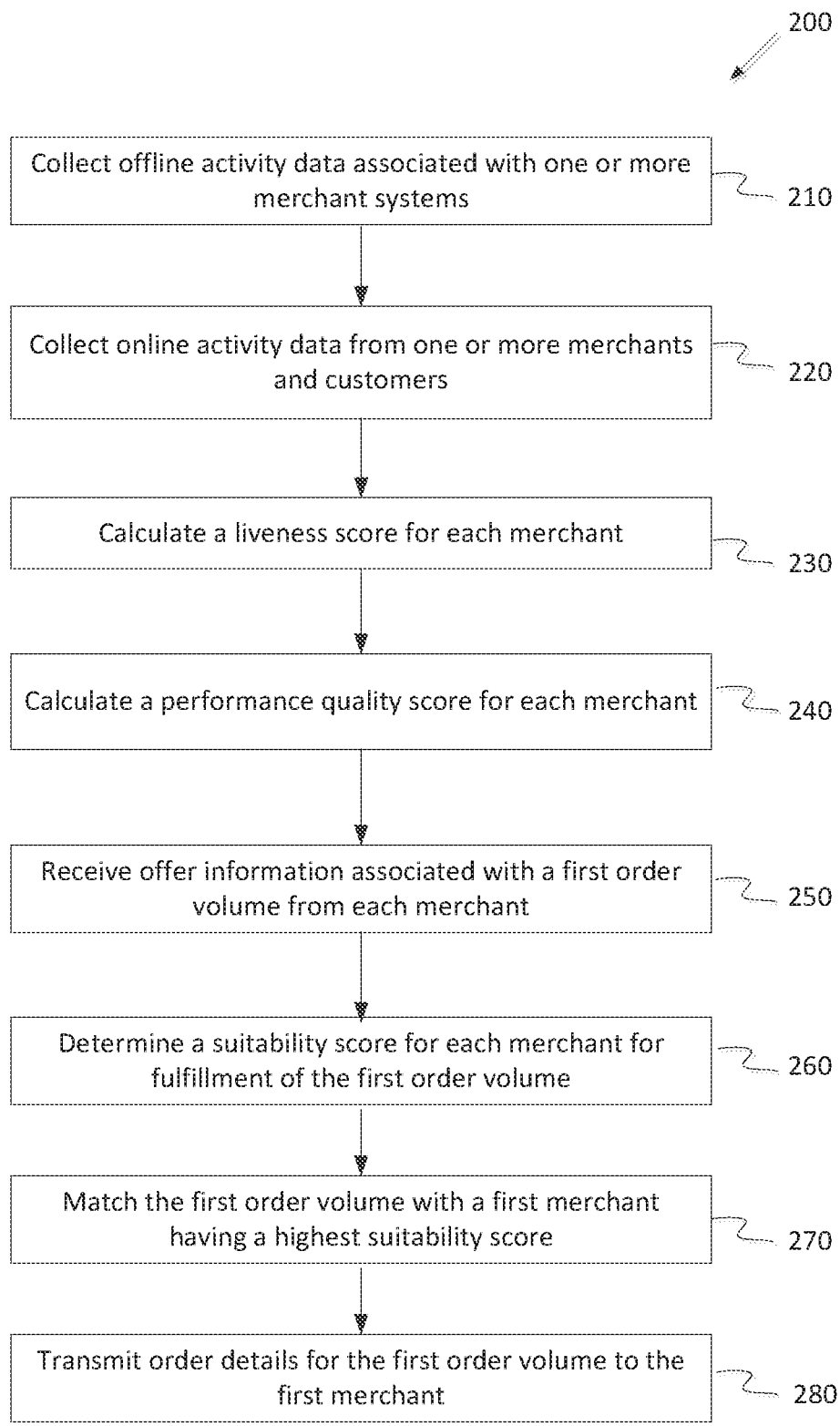
FIG. 2 depicts a flowchart illustrating one example of functionality implemented by a merchant management system, according to various embodiments of the present disclosure.

FIG. 2 illustrates a flowchart that provides an example of an order volume management process 200 executed by an order management application (e.g., order management application 100 of FIG. 1) executed by a merchant management system (e.g., merchant management system 50 of FIG. 1), according to various embodiments of the present disclosure. It is understood that the flowchart of FIG. 2 provides an example of the many different types of functional arrangements that may be employed to implement the operation of the order management application 100 as described herein.

In block 210, offline activity data is determined for multiple different merchant systems. As detailed above, the offline activity data may relate to parameters, factors, and information associated with a merchant and merchant system that impact the order fulfillment process. The offline activity data may include, for example, information about a state of a computing device (e.g., tablet) of the merchant system. The state of the tablet may include, for example, whether the tablet is turned on, the Wifi connection strength of the tablet, the location of the tablet (e.g., GPS coordinates), a volume setting of the tablet, and other heuristic information that relates to operation of the tablet that may be collected by the tablet during its normal operation and provided to a client order management application installed on the tablet.

Example offline activity data may also include information relating to a merchant's menu or catalog (e.g., menu or catalog items), a list of ingredients or components associated with the menu or catalog items (e.g., the ingredients used in the preparation of a menu item), a current inventory of ingredients or components maintained by a merchant, etc. In one embodiment, the offline activity data may be collected over any suitable period of time and may be updated periodically according to a schedule or updated in real-time in view of updates received from the merchant system. In one embodiment, the order management application of the merchant management system may send a request for updated offline activity data form the merchant system. In another embodiment, the merchant system is configured to push or send updates including the offline activity data to the order management application.

In an embodiment, communication between the order management application and the merchant system is facilitated by providing a client application including an API configured to interface with the order management application. For example, the order management application may include a first API configured to enable communications with a first merchant system, a second API configured to enable communications with a second merchant system, and a third API configured to enable communications with a third merchant system. In an implementation, the order management application may include an API configured to enable communication with multiple merchant systems.

Advantageously, the order management application to be executed by a single computing device (e.g., a server) or multiple distributed computing devices (e.g., a cloud server environment) and information relating to the ordering process 200 may be displayed via a user interface of a tablet located at a merchant location, as described in greater detail below.

In block 220, online activity data associated with one or more merchants is collected by the order management system from one or more merchants. In one embodiment, online activity data is stored in a memory associated with the merchant management system. In an embodiment, the order management application may create a record relating to a merchant system or order to store associated online activity data (e.g., in a memory such as memory 70 in FIG. 1, in cache, etc.). The online activity data may be stored in association with the respective merchant and merchant system with which the data is related. Example online activity data may include customer ratings, historical order information, delivery information (e.g., delivery distance, actual delivery time, estimated delivery time), customer refund requests, merchant tablet connectivity information (e.g., current connection status, times of day the tablet is connected to the order management system), etc.

In block 230, a liveness score is calculated for the one or more merchants. As detailed above, the liveness score represents a quantified value of an availability of a merchant. In one embodiment, the liveness score may be a numeric value or percentage represented on a scale of 0 to 100. For example, the liveness score may be a measurement of a time that the merchant is deemed buyable, discoverable, and available for allocation of an order volume.

In one embodiment, the liveness score may be based on a connectivity level of a merchant system as measured by the availability of a computing device (e.g., a tablet) employed at a merchant location for communication with the merchant management system. For example, the liveness score may be based on at least one of a Wifi strength and location (e.g., longitudinal and latitudinal coordinates) associated the merchant's computing device. In one embodiment, multiple factors may be used to calculate the liveness score, wherein different importance weights or values may be assigned to each of the various data components used to calculate the liveness score. For example, a first merchant having a merchant system including a tablet (executing a client version of the order management application) with a strong Wifi connection strength, expanded business hours (e.g., breakfast service hours and late night hours), a high number of staff members during prime shifts, a high number of available delivery drivers may have a liveness score of 95 out of 100. In this example, a second merchant may have a merchant system including a tablet with a weak Wifi signal, a volume of the tablet turned off, and a limited delivery staff may have a calculated liveness score of 63 out of 100.

In block 240, a performance quality score is calculated for the one or more merchants. As detailed above, the performance quality score represents a quantified value or measurement of quality of a performance by a merchant based on historical order processing. For example, the performance quality score may be based on customer feedback (e.g., reviews, refund requests, rate of repeat business, etc.) and ratings relating to previous experiences with a merchant.

In one embodiment, the performance quality score may include a score component relating to the delivery performance associated with a merchant. The delivery score may represent a measure of how a merchant performed in the delivery phase of the order process. For example, the delivery score may compare a merchant's actual delivery performance (e.g., time from order intake to delivery, quality of the delivery (e.g., was the food item delivered hot, was the delivery driver courtesy, etc.) as compared to merchant estimates or guarantees regarding the delivery (e.g., a rate comparing actual delivery times compared to estimated or promised delivery times, a guaranteed concerning the quality of the delivery, etc.). In an example, the delivery score may take into account a distance of the delivery, a size of the order, historical and predicted times it takes from point to point (e.g., merchant location to customer location), a comparison of delivery times for multiple geographically proximate merchants to multiple geographically proximate customers, etc.

In block 250, offer information may be received from multiple merchants in relation to a pending order volume (e.g., one or more actual customer orders that are in process and have not yet been allocated to one or more merchants for fulfillment), also referred to as a "first order volume." It is noted that the order volume may include a single order or multiple orders and that each order may be for one or more goods. In one embodiment, the offer information includes the batch size of an order volume the merchant seeks to receive in an allocation, a revenue sharing rate (e.g., a revenue amount to be shared with an operator of the merchant management system), performance estimates or guarantees (e.g., delivery estimates, delivery guarantees), promotions, offers, coupons, price per unit, price per batch size, etc.

In block 260, a suitability score is determined for each merchant for fulfillment of the first order volume. In one embodiment, the suitability score is based on the liveness score, the performance quality score, the offline activity data, and the offer information submitted by a merchant in association with the first order volume. For example, the suitability score may be a weighted average of any combination of the aforementioned factors. In one embodiment, the suitability score provides a measurement of a particular merchant's suitability to process the first order volume. Advantageously, the suitability score may be based on multiple factors including one or more sub-scores (e.g., the liveness score, the performance quality score, and the delivery score) and the offer information received from the merchant.

In one embodiment, a weight assigned to each of the factors considered in determining the suitability score may be selected as a default setting in the merchant management system or adjusted and set by a user of the merchant management system. In one embodiment, the multiple merchants may be ranked according to the suitability score generated by the merchant management system. For example, the multiple merchants may be ranked or listed in an order (e.g., highest to lowest) based on their respective suitability score.

In an embodiment, one or more of the liveness score, the performance quality score, the delivery score, the offline activity data, or the suitability score may be presented to the merchant via a graphical user interface of the merchant system. In this embodiment, the merchant may monitor this information and use the information in formulating future offers and as feedback regarding the merchant's performance.

In block 270, the first order volume is matched or allocated to a merchant having a highest suitability score (e.g., a first merchant). In one embodiment, selection of the first merchant based on the first merchant having the highest relative suitability score (as compared to the other eligible merchants) results in an allocation of the first order volume to a recommended or preferred merchant in view of the multiple factors identified above.

In block 280, the order details relating to the first order volume are transmitted to the selected merchant (e.g., the first merchant). For example, the order details (e.g., the customer name, customer location, order description, price, revenue share information, delivery estimate, customer requests, etc.) may be provided to the merchant via a graphical user interface of the tablet operating at the merchant location.

Figure 3:
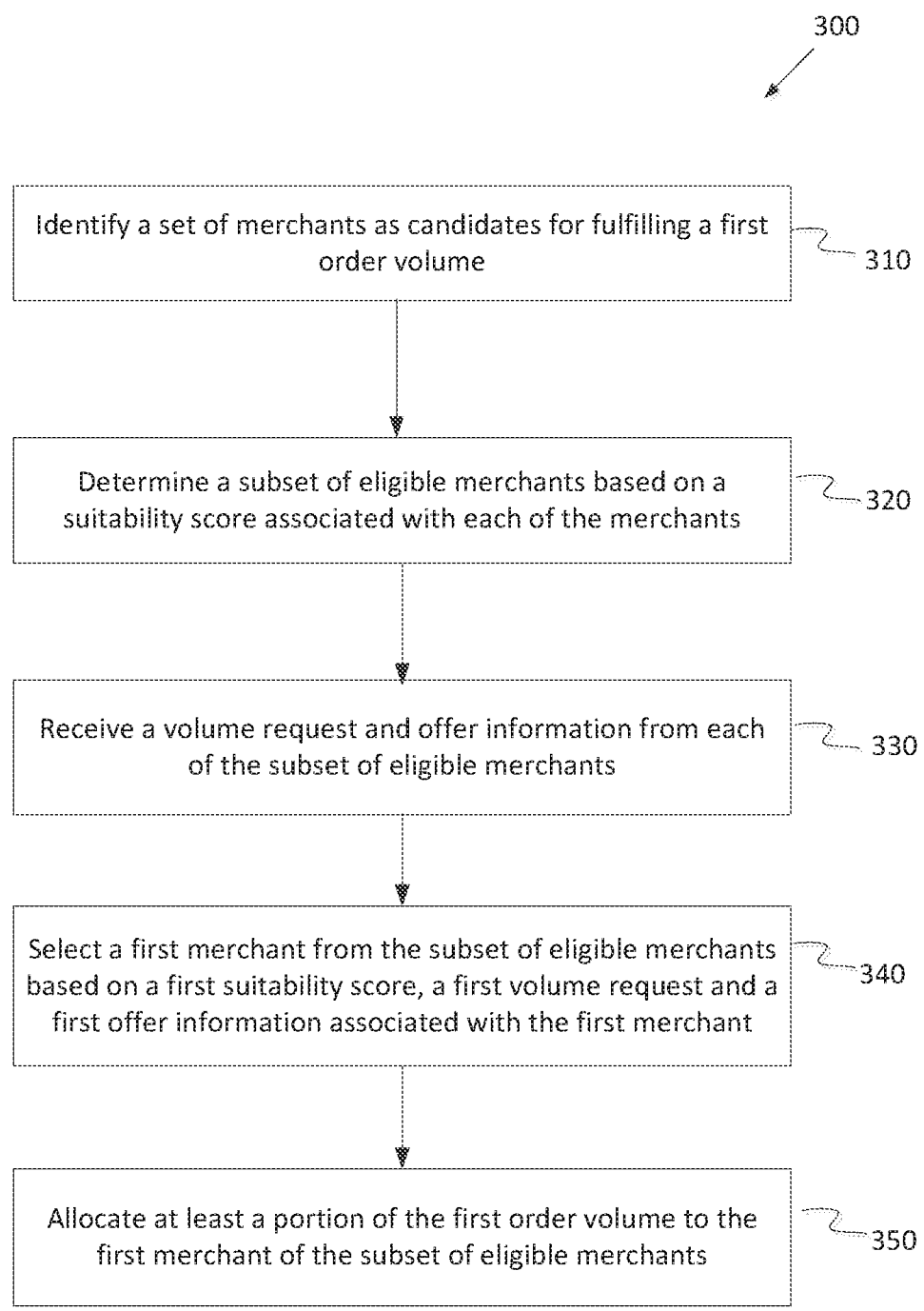
FIG. 3 depicts a flowchart illustrating one example of functionality implemented by a merchant management system, according to various embodiments of the present disclosure.

FIG. 3 illustrates a flowchart that provides one example of an order management process 300 executed by an order management application (e.g., order management 100 of FIG. 1) executed by a merchant management system (e.g., merchant management system 50 of FIG. 1), according to embodiments of the present disclosure. It is understood that the flowchart of FIG. 3 provides an example of the many different types of functional arrangements that may be employed to implement the operation of the order management application 100 as described herein.

In one embodiment, process 300 relates to the management of multiple offers from multiple merchants for fulfillment of an order volume (e.g., a first order volume). It is noted that the first order volume may relate to an actual order request received from one or more customers (e.g., an order volume placed by one or more customers that has not yet been allocated to a merchant) or a prospective order volume (e.g., an order volume that a merchant wishes to have allocated to them during an upcoming time period, such as, the next 10 minutes, the next hour, over the next day, over the weekend, over the next week, over the next month, etc.).

In block 310, a set of merchants is identified as candidates for fulfilling a first order volume. The identified set of merchants may include any number of merchants that satisfy particular criteria relating to the first order volume (e.g., having a minimum liveness score, having a minimum performance quality score, having certain offline activity data associated with the merchant, having communicated an express interest in increasing their allocated order volume, having accepted an offer for an offer for the first order volume, a combination of the aforementioned criteria, and the like).

In block 320, a subset of eligible merchants is identified based on an analysis of a suitability score associated with each of the merchants of the set of merchants. For example, the set of merchants may include 20 merchants that satisfy the initial criteria as potential candidates, in block 310. In block 320, the set of 20 merchants may be filtered down to 5 merchants that have a suitability score that matches requirements associated with the first order volume. For example, the first order volume may be associated with a requirement that identifies eligible merchants having a suitability score above a threshold value (also referred to as the "suitability threshold value"). In this example, the threshold value may be set by a customer, the merchant management system, one or more of the merchants (e.g., a first merchant may indicate that they want to learn of order volume opportunities if their own suitability score exceeds a value of 90). In one embodiment, the filtered list of merchants includes the subset of eligible merchants as it relates to allocation of all or a portion of the first order volume. For example, a suitability threshold value of 94 may be set in the merchant management system. In this example, those merchant systems having a suitability score of 94 or higher are deemed eligible for fulfillment of the order volume and are filtered from the initial set of candidate merchant systems.

In block 330, the order management system solicits and receives a volume request and offer information from each of the subset of eligible merchants. In one embodiment, a first merchant of the subset of eligible merchants may submit a request to have all or a portion of the first order volume allocated to the first merchant. For example, the request for a desired volume, also referred to as a volume request, may be for the entire first order volume or a portion thereof. In one embodiment, each merchant submits offer information relating to their volume request. In one embodiment, the offer information includes, but is not limited to, a revenue sharing value submitted by the merchant. In this example, each merchant identifies a revenue sharing value (e.g., a percentage) that it is willing to share with the merchant management system as it relates to allocation and processing of all or a portion of the first order volume.

In one embodiment, at least one of the liveness score, performance quality score, or delivery score may be presented to a merchant to enable the merchant to tune their volume (e.g., set their volume request) and set their offer information. For example, a merchant with a relatively low performance quality score may elect to submit aggressive offer information including a higher relative revenue share value to potentially increase the merchant's chances at receiving an allocation within the auction process.

In one embodiment, each merchant is provided with the opportunity to set a higher or lower revenue share value depending on a volume the merchant is seeking. For example, a merchant may submit an adjustable revenue share value that is dependent on a volume allocation to the merchant. In one embodiment, the merchant may set a lower revenue share value in the event that a lower volume is requested or allocated. In another embodiment, if a higher order volume is available (e.g., the first order volume is high) and the merchant wishes to submit a high volume request, the merchant may set a higher revenue share value.

In block 340, a merchant is selected from the subset of eligible merchants based on a suitability score associated with the merchant, the volume request, and the offer information associated with the first merchant. For example, a merchant (e.g., the first merchant) may be selected to fulfill the entire first order volume based on having the highest suitability score. In one embodiment, multiple merchants may be selected from the subset of eligible merchants to fulfill portions of the first order volume.

In block 350, at least a portion of the first order volume is allocated to the first merchant based on the selection made in block 340. In one embodiment, the allocation of the at least a portion of the first order volume includes providing order details to the first merchant. In one example, the entire first order volume may be allocated to the first merchant in view of the first merchant's volume request and offer information. In one embodiment, the allocation of the first order volume (whole or portion thereof) is performed in accordance with the offer information submitted by the first merchant. As noted, the first order volume may be broken down into multiple portions and allocated to multiple different merchants based on the selection stage in block 340.

Figure 4:
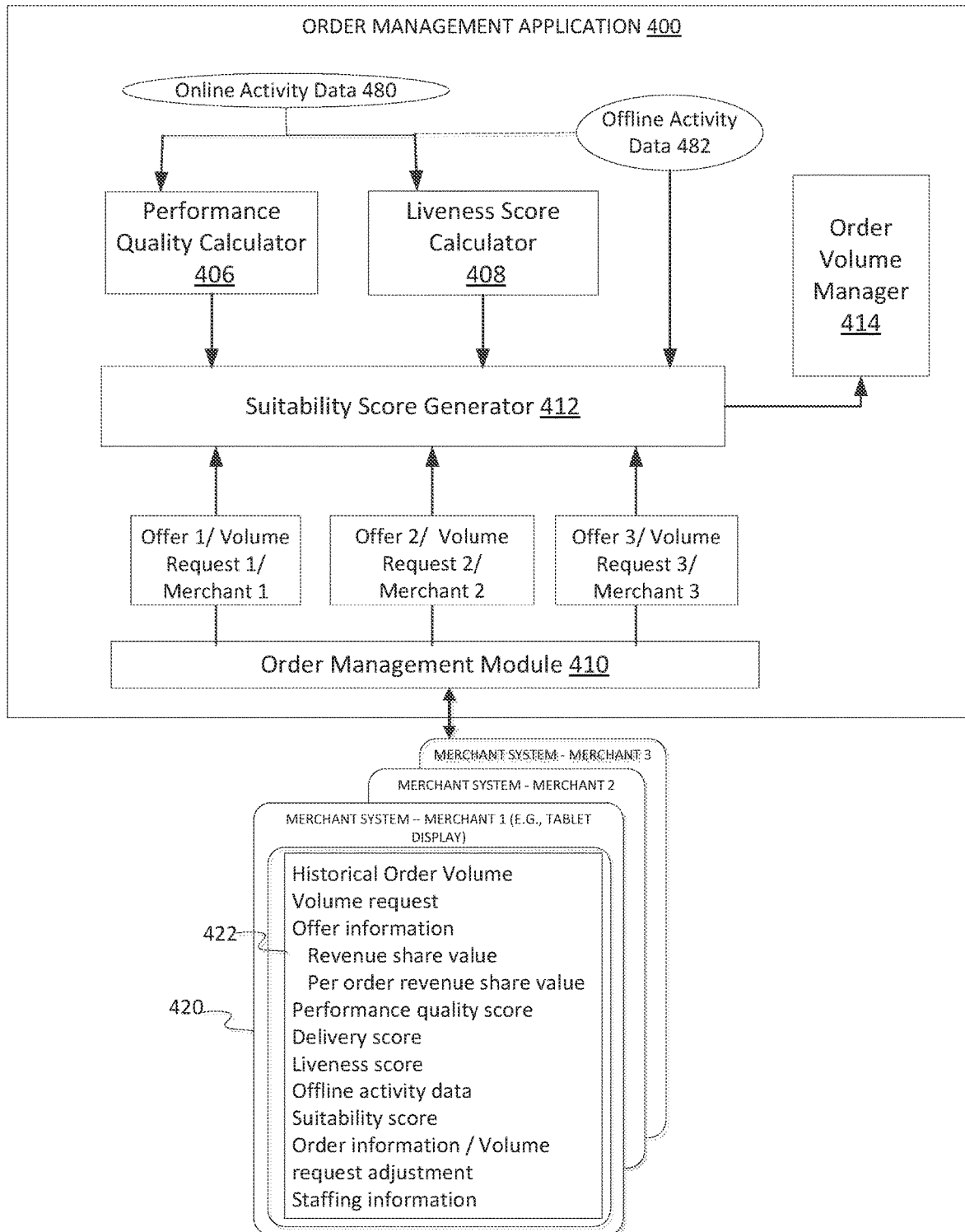
FIG. 4 illustrates an order management application to allocate an order volume to one or more merchant systems, according to various implementations of the present disclosure.

FIG. 4 illustrates a non-limiting example of an order management application 400 processing and managing multiple offers (e.g., Offer 1, Offer 2, and Offer 3) received from multiple merchant systems 420 (e.g., Merchant 1, Merchant 2, and Merchant 3) relating to an order volume to be allocated by the merchant management system (e.g., merchant management system 50 of FIG. 1, in accordance with process 300 of FIG. 3.

In one embodiment, the order management application 400 includes a offer management module 410 configured to interface with the merchant systems and receive offer information (e.g., Offer 1, Offer 2, and Offer 3) and a volume request (e.g., Volume Request 1, Volume Request 2, and Volume Request 3). It is noted that the respective volume requests may be less than, equal to, or greater than the order volume that is to be allocated. In one embodiment, the order volume may be based on one or more actual customer requests (i.e., orders that have not yet been allocated to a merchant) or prospective order volume (e.g., an order volume to be allocated based on future demand).

In one embodiment, the merchant system 420 (e.g., a tablet) may include a graphical user interface 422 to display information associated with the order volume management process 300 of FIG. 3. Exemplary information that may be displayed via the graphical user interface 422 may include historical order volume associated with the merchant, the merchant's volume request, the merchant's offer information including a revenue share value and per order revenue share value, a performance quality score, a delivery score, a liveness score, a suitability score, the merchant's offline activity data, and other information relating to the order management process.

In one embodiment, a merchant may tune or adjust their offer information using the merchant system 420. As shown in FIG. 4, a offer information or volume request adjustment may be submitted by the merchant in view of the other data elements provided to the merchant system by the order management application 400. For example, a merchant may tune their volume request or adjust their offer information (e.g., increase or decrease their revenue share value) based on the information it receives from the order management application 400. In one embodiment, the order management application 400 may use the adjusted offer information or adjusted volume request to re-calculate a suitability score and adjust the order volume allocated to the merchant system (e.g., increase the allocated order volume or decrease the allocated order volume in view of the changes to the offer information or volume request). Advantageously, according to one embodiment, the merchant may have greater control over the order volume it receives via allocations from the order management application 400.

In one embodiment, a suitability score generator 412 receives (either via a push or a pull communication) the offer information and volume request from the offer management module 410 for each of the submitting merchant systems. The suitability score generator 412 also receives (either via a push or a pull communication) a performance quality score and a liveness score for each of the merchant systems. In one embodiment, the performance quality score is generated by the performance quality calculator 406 based on at least a portion of the online activity data 480 and, optionally (as denoted by the dashed line in FIG. 4), at least a portion of the offline activity data 482. In one embodiment, the liveness score is calculated by the liveness score generator 408 based on at least a portion of the online activity data 480 and, optionally, at least a portion of the offline activity data 482.

In an embodiment, the suitability score generator 412 may also receive the offline activity data 482 maintained by the order management application 400. As described above in connection with FIG. 3, the suitability score generator 412 generates a suitability score for each of the merchants. The suitability scores are provided to an order volume manager 414 to match the merchants to an order volume allocation and provide the corresponding order volume details to the merchant.

FIG. 5 illustrates an example table including information generated by process 300 of FIG. 1. As shown in this example, a requested order volume, merchant offer information, a suitability score, a merchant ranking, and an order volume allocation are generated for each of the three eligible merchant systems that submitted offers for order volume allocation. As shown, order volume allocation s are made with respect to merchants 1, 2, and 3 based on their respective rankings as it relates to the calculated suitability scores. In this example, during an offering phase, the merchants submitted offer information relating to a prospective order volume (e.g., a number of pizza orders the merchant wished to receive in the next thirty days). A suitability score (on a scale of 0 to 100 percent) was calculated for each merchant and a corresponding ranking was generated. Advantageously, the information shown in the chart in FIG. 5 may be stored in a memory of a merchant management system and used in subsequent iterations of the processes detailed in the present application.

Advantageously, the customer devices may be provided with a message identifying the one or more merchants (e.g., as an advertisement) with an indication of a promotion (e.g., a 20 minute guaranteed delivery) to drive customer behavior in view of the order volume allocation. In one embodiment, the promotional messages may assist in matching future customer demand with merchant's having available throughput and capacity. Unlike a physical pre-manufacturer good (e.g., a widget), bespoke or made-to-order goods are produced on-demand and the order management application enables a merchant to control the amount of demand the merchant is willing to take on.

Figure 6:
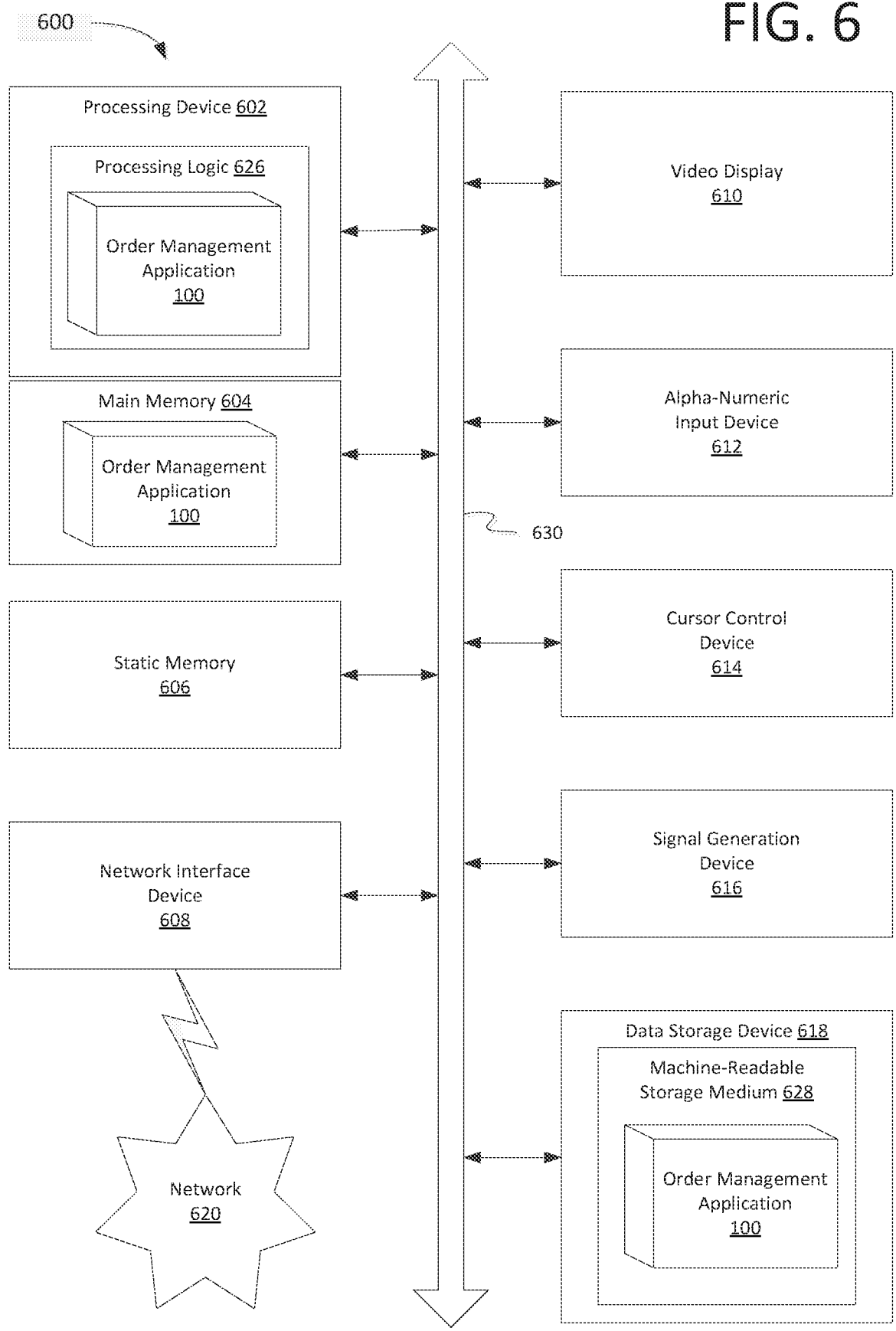
FIG. 6 is a schematic block diagram that provides one example illustration of a computing environment executing an order management application, according to various embodiments of the present disclosure.

FIG. 6 illustrates a diagrammatic representation of a machine in the exemplary form of a computer system 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent computing device(s) 301 of FIG. 3.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for a document classification system 100 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the order management application 100 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "collecting", "calculating", "receiving", "determining", "matching", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   collecting, by a processing device of a merchant management system, offline activity data associated with a first food merchant system of a plurality of food merchant systems, wherein the offline activity data comprises a first time it takes the first food merchant to source ingredients for a food product offered by the first food merchant, a second time it takes the first food merchant to prepare the food product, a third time it takes the merchant to prepare an order comprising the food product for delivery;
   collecting, by the processing device from a first computing device of a first food merchant system of the plurality of food merchant systems, online activity data corresponding to historical food orders processed by the first food merchant system, wherein the online activity data comprises location information associated with the first computing device operated by the first food merchant system and customer feedback ratings associated with a performance of the first food merchant system associated with the historical food orders;
   measuring, by the processing device, a connection quality between the merchant management system and the first food merchant system based at least in part on at least one of a state of the first computing device, location information associated with the first computing device, or a network strength of the first computing device;
   calculating, by the processing device, a liveness score for the first food merchant system, wherein the liveness score represents a first measure of the connection quality between the merchant management system and the first food merchant system;
calculating, by the processing device, a performance quality score for the first food merchant system, wherein the performance quality score represents a second measure of a performance by the first food merchant system based on customer feedback associated with the historical food orders processed by the first food merchant system;
receiving, by the processing device from the first food merchant system, offer information associated with a first order volume, wherein the offer information comprises a revenue share value associated with the first order volume;
determining, by the processing device, a suitability score for the first food merchant system, wherein the suitability score represents a third measure to determine a match between the first food merchant system and the first order volume, and wherein the suitability score is based on the offer information, the offline activity data, the liveness score and the performance quality score associated with the first food merchant system;
matching, by the processing device, at least a first portion of the first order volume with the first merchant system based on the suitability score; and
transmitting, by the processing device, order details for the at least the first portion of first order volume to the first food merchant system.

2. The method of claim 1, further comprising:
receiving, from the first food merchant system, adjusted offer information; and
calculating an updated suitability score for the first food merchant system based on the adjusted offer information.

3. The method of claim 1, further comprising:
comparing the suitability score associated with the first food merchant system with the plurality of additional suitability scores associated with the other food merchant systems; and
determining the suitability score associated with the first food merchant system exceeds a second suitability score associated with a second food merchant system of the plurality of food merchant systems.

4. A merchant management system comprising:
a memory to store instructions; and
a processing device operatively coupled to the memory, the processing device to execute the instructions to:
identify a set of merchant systems as candidates for fulfilling an order volume received from a plurality of customer devices, wherein the set of merchant systems comprising a plurality of merchant systems;
measure a connection quality between a merchant management system and a first merchant system based at least in part on at least one of a state of a computing device associated with the first merchant system, location information associated with the computing device, or a network strength of the computing device;
calculate a liveness score for the first merchant system, wherein the liveness score represents a first measure of the connection quality between the merchant management system and the first merchant system;
determine, based at least in part on the liveness score, the first merchant system of the plurality of merchant systems is eligible to fulfill the order volume based on a first suitability score exceeding a suitability threshold value;
determine a second merchant system of the plurality of merchant systems is eligible to fulfill the order volume based on a second suitability score exceeding a suitability threshold value;
receive first offer information comprising a first revenue share value from the first merchant system;
receive second offer information comprising a second revenue share value from the second merchant system;
determine the first revenue share value exceeds the second revenue share value;
select the first merchant for allocation of the order volume; and
allocate the order volume to the first merchant system.

5. The system of claim 4, the processing device to receive a first volume request from the first merchant system.

6. The system of claim 5, the processing device to determine the first volume request exceeds the order volume.

7. The system of claim 4, the processing device to:
determine a third suitability score associated with a third merchant system is less than the suitability score threshold; and
determine the third merchant system is ineligible to fulfill the order volume.

8. The system of claim 4, wherein the suitability score threshold value is selected by a customer via a customer device.

9. The system of claim 4, the processing device to:
collect online activity data corresponding to historical orders processed by the first merchant system.

10. The system of claim 9, wherein the suitability score comprises a performance quality score component representing a measure of a performance by the first merchant system derived from the online activity data corresponding to fulfillment of the historical orders by the first merchant system.

11. The system of claim 4, the processing device to provide a promotional message associated with the first merchant system to a plurality of customer devices.

12. The system of claim 4, the processing device to transmit order offer data to the first merchant system and the second merchant system, wherein the order offer data comprises details associated with the fulfillment of the first order volume.

13. A method comprising:
identifying, by a processing device of a merchant management system, a first order volume to be fulfilled during a first time period;
measuring a connection quality between the merchant management system and a first merchant system based at least in part on at least one of a state of a computing device associated with the first merchant system, location information associated with the computing device, or a network strength of the computing device;
calculating a liveness score for the first merchant system, wherein the liveness score represents a first measure of the connection quality between the merchant management system and the first merchant system;
determining, by the processing device based at least in part on the liveness score, a suitability score associated with the first merchant system exceeds a suitability score threshold, wherein the suitability score is based at least in part on offline activity data collected by the merchant management system;

matching, by the processing device, at least a first portion of the first order volume with the first merchant system; and causing at least a portion of order details associated with the first order volume to be displayed via an interface of a computing device of the first merchant system.

14. The method of claim 13, further comprising:
determining, by the processing device, the suitability score associated with the first merchant system exceeds a plurality of other suitability scores.

15. The method of claim 13, further comprising:
collecting, by the processing device, online activity data corresponding to historical food orders processed by the first merchant system.

16. The method of claim 13, further comprising:
calculating, by the processing device, a performance quality score for the first merchant system, wherein the performance quality score represents a measure of a performance by the first merchant system associated with historical orders processed by the first merchant system.

17. The method of claim 16, wherein the performance quality score comprises a delivery score associated with the first merchant system.

* * * * *